July 16, 1968 C. J. N. CANDY 3,393,326

PRECISION TIMING OF SIGNALS EMPLOYING DIODE-CAPACITOR NETWORK WITH TWO CURRENT SOURCES PROVIDING CONSTANT CONDUCTION RATIO FOR INPUT SIGNALS OF VARYING AMPLITUDE

Filed Jan. 7, 1966

INVENTOR
C. J. N. CANDY
BY G. E. Kersey
ATTORNEY

United States Patent Office 3,393,326
Patented July 16, 1968

3,393,326
PRECISION TIMING OF SIGNALS EMPLOYING DIODE-CAPACITOR NETWORK WITH TWO CURRENT SOURCES PROVIDING CONSTANT CONDUCTION RATIO FOR INPUT SIGNALS OF VARYING AMPLITUDE

Charles J. N. Candy, Convent Station, N.J., assignor to Bell Telephone Laboratories, Incorporated, New York, N.Y., a corporation of New York Filed Jan. 7, 1966, Ser. No. 519,287
4 Claims. (Cl. 307—269)

ABSTRACT OF THE DISCLOSURE

In precision timing of signals, the timing circuit should be insensitive to variations in input signal amplitude and to parameter variations in the circuit components. Independence from these variations may be accomplished by apparatus which controls the conduction time of a switching element to a precise fraction of the input cycle period in accordance with input signal amplitude.

This invention relates to timing and, more particularly, to the precision timing of signals.

A signal is said to be "timed" when its occurrence has been established with precision. Timing is of importance in pulse code modulation, in the measurement of phase and frequency, and in synchronization generally.

In the case of conventional timing arrangements, a distinctive output, such as a pulse signal, is produced by a trigger network each time a varying input exceeds a fixed threshold level. The result is an output timing wave which, in the case of pulse signals, is known as a clock pulse train.

For enhanced accuracy in timing, it is customary to set the threshold so that triggering takes place at the zero crossings of the applied input. In practice it is impossible to maintain this kind of setting because of component imperfections and input variations, and a consequent imprecision is introduced into the derived timing wave.

Aside from timing degradation associated with threshold effects, conventional timing networks are characterized by delay between the initiation of triggering and the generation of the desired output. This delay is both amplitude and waveform sensitive. For example, with two inputs of the same general waveform the one that attains the smaller amplitude will give rise to the output with the greater delay. This kind of timing degradation is particularly pronounced and undesirable at high frequencies.

Accordingly, it is an object of the invention to facilitate the precision timing of signals. A related object is to do so at high frequencies. A further object of the invention is to generate a timing wave which is substantially independent of both the amplitude and the waveform of an applied input. A still further object is to generate a timing wave which is substantially independent of the parameter values of the components by which the timing wave is generated.

In accomplishing the foregoing and related objects, the invention provides for controlling the threshold of operation of a switch according to the characteristics of an applied input. The control is exercised by a threshold adjustment network which responds to the input and operates for an interval that is a prescribed fraction of the input cycle, regardless of variations in the applied input and in the components by which the timing wave is generated.

It is an aspect of the invention that by thus controlling the interval of conduction, the generated timing wave is locked in phase with respect to the applied input.

In one embodiment of the invention, the threshold adjustment network employs an energy storage component in conjunction with opposed polarity energy sources. The energy storage component is used to establish the threshold level of the switch. For this embodiment, the switch desirably takes the form of a transistor which is biased for non-saturating amplification in the common emitter mode.

When an input applied to the switch changes in one direction of conduction, the entire output from one of the energy sources is diverted to the switch, while the other current source feeds the energy storage device and thus alters its storage condition. When the applied input changes in the other direction of conduction, the entire output from the first energy source is diverted to the energy storage device to re-establish the original storage condition. In equilibrium the fraction of the input cycle during which the switch is conducting is the ratio of the output magnitudes of the two energy sources.

To fix the conduction interval, and thus establish the timing with a high degree of precision, the energy storage device of the adjustment network is desirably proportioned to be sufficiently large so that the threshold level established by its does not change over the cycle.

Other aspects of the invention will become apparent after considering an illustrative embodiment taken in conjunction with the drawings in which.

Figure 1:
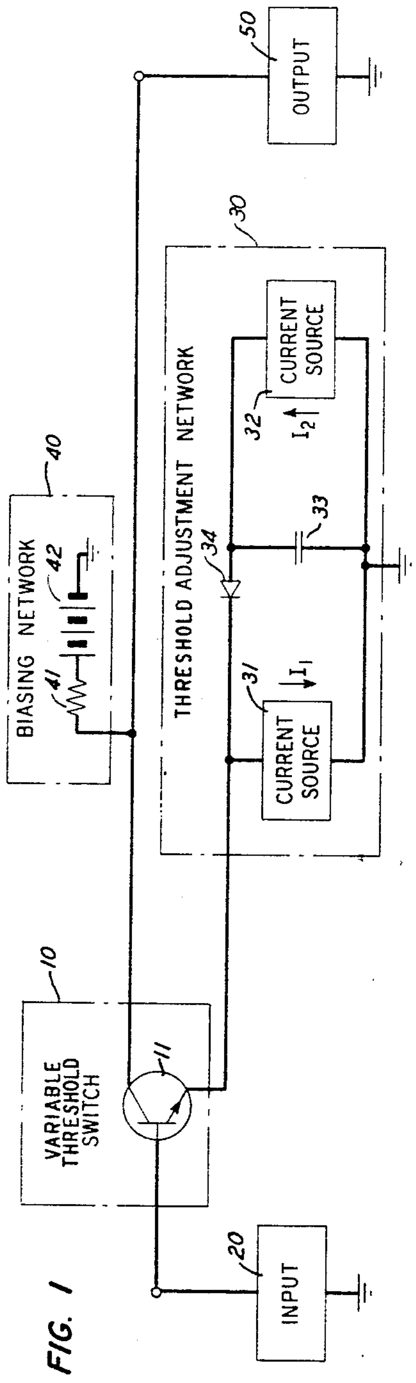
FIG. 1 is a diagram of a timing network in accordance with the invention.

Turning to FIG. 1, a timing network in accordance with the invention includes a variable threshold switch 10 whose switching level is controlled according to the signals applied from an input 20 by a threshold adjustment network 30.

In the embodiment of FIG. 1 the switch 10 takes the form of an n-p-n transistor 11 with its base connected to the input 20 and its emitter connected to the adjustment network 30. In addition, the transistor 11 is prebiased at its collector for non-saturating operation by biasing network 40. The biasing network 40 is organized in conventional fashion with a biasing resistor 41 and a biasing battery 42.

When a periodic signal is applied to the switch 10, a regulated and precisely timed wave appears at an output 50. The input signal can vary within wide limits without affecting the output timing wave because of the action of the adjustment network 30 in regulating the operating interval of the switch 10.

For the embodiment of FIG. 1, the adjustment network 30 includes oppositely poled current sources 31 and 32 in shunt with an energy storage element taking the form of a capacitor 33 and interconnected by an isolating element taking the form of a diode 34.

Figure 2:
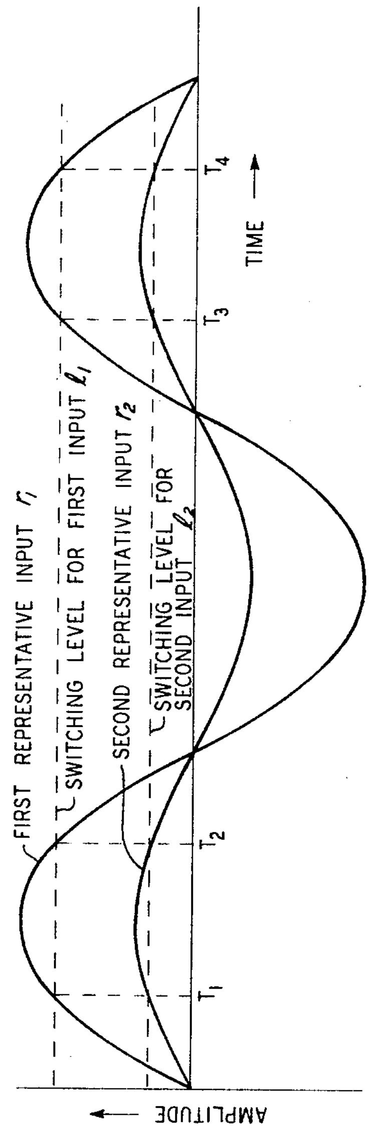
FIG. 2 is a graph of representative inputs applicable to the timing network of FIG. 1.

For the purposes of illustration, it will be assumed that a current $I_1$ of the first current source 31 in the adjustment network 30 is four times the magnitude of a current $I_2$ of the second current source 32. In that event, as illustrated by FIG. 2, a substantially regular timing pulse appears at the output 50 between the intervals $T_1$ and $T_2$ and between the intervals $T_3$ and $T_4$. The timing pulses will be of the same waveform regardless of whether the applied signal takes the form of the first representative input $r_1$ of FIG. 2 or the second representative input $r_2$. This is because in steady state operation the threshold level of the switch 10 is adjusted by the network 30 in response to the first representative input $r_1$ to a first level $l_1$, as shown in FIG. 2; while the corresponding threshold for the second representative level $r_2$ is adjusted by the network 30 to a correspondingly reduced switching level $l_2$. Thus, in the case of both inputs, although they have different amplitudes, the generated timing pulse endures for the same interval, e.g., $T_1$ through $T_2$, which is a fixed fraction of the input cycle.

The adjustment in switching level illustrated by FIG. 2 takes place because of the way in which the threshold adjustment nework 30 is organized. The capacitor 33 of that nework is desirably proportioned according to Equation 1, below, to be large enough to prevent a significant change of voltage when current flows to it during the interval of each input cycle.

$$C > \frac{I}{fV} \quad (1)$$

where C is the capacitance of the capacitor 33, I is the current flowing into the capacitor, $f$ is the frequency of the applied signal and V is the threshold voltage established by the capacitor. At the same time the capacitance C of the capacitor 30 is small enough to allow the threshold voltage to adjust quickly to external changes such as the variation of the mean amplitude of the input signal.

In the absence of an applied input, one fourth of the current $I_1$, equal in magnitude to the second current $I_2$, flows in a loop which includes the first and second current sources 31 and 32 and the diode 34. The capacitor 33 is charged to a voltage V which is substantially the level of the steady state condition of the input 20. The remaining three-fourths of the current $I_1$ flows through the transistor 11 which is thus operated in its common emitter configuration and is highly responsive to any signal applied at its base electrode.

When a positive going representative input is applied, the conduction of the transistor 11 increases, the diode 34 is cut off and the entire current of the current source 31 flows through the transistor to the output 50. At the same time the current source 32 can be considered as charging the capacitor 33. When the input falls below the threshold level established by the capacitor 33, the current from the source 31 is diverted entirely to the capacitor which is discharged. In the steady state there can be no net change in the charge on the capacitor 33. Hence the fraction of the time that the diode conducts must equal the ratio of the currents of the two sources 31 and 32. This ratio is the same regardless of the applied input and regardless of any parameter variations in the network of FIG. 1.

Consequently, for the embodiment of FIG. 1, the switch operating time is one-fourth of the cycle since in the example under consideration it has been assumed that current $I_1$ is four times as great as $I_2$. It will be apparent that if the ratio of the current magnitudes is made 2:1 instead of 4:1, the threshold of the switch 10 will be set for switching at the zero crossings of the input signal and a substantially rectangular timing pulse will be produced for each half cycle of the applied inputs. If the ratio of currents $I_1$ and $I_2$ is not exactly 2:1, there will be a slight phase displacement from the zero crossings which, by contrast with conventional timing networks, is invariant of amplitude fluctuations. In addition, the operation of the timing network of FIG. 1 is unaffected by waveform distortion—either due to the presence of a steady state component or due to second harmonic content. The network ignores any direct-current component and all even harmonics. In the case of a distorted input, the switch triggers at times when the sum of the fundamental and the odd harmonics is zero.

In a working model of the invention tested in the laboratory with the current $I_1$ set at 10 milliamperes and the current $I_2$ set at 5 milliamperes, a timing wave with substantially rectangular pulses of 10 nano($10^{-9}$)seconds duration was produced with a timing error of less than $\frac{1}{500}$ of a cycle for a 50 megacycle input whose amplitude varied between 0.1 volt and 5 volts. For this working model the transistor 11 of FIG. 1 was a type 2N709 manufactured by the Radio Corporation of America, the diode 34 of the adjustment network 30 was a type 2Q10–50 manufactured by the International Diode Corporation, the biasing resistor 41 had a resistive magnitude of 100 ohms, the biasing battery 42 had a potential of 6 volts and the capacitor 33 had a capacitive magnitude of 0.02 microfarad. Currents $I_1$ and $I_2$ were generated in conventional fashion by connecting respective impedances of large magnitude to respective voltage sources.

Other adaptations and modifications of the invention will occur to those skilled in the art.

What is claimed is:

1. In combination:
- an electronic switch;
- means for applying a cyclically varying input to said switch; and
- adjustment network means, including an energy storage element, first and second energy sources connected in shunt with said energy storage element, and isolating means interconnecting said first energy source with said second energy source, connected to said switch for constraining the conduction time of said switch to a precise fraction of a cycle of said input thereby to adjust the threshold of conduction according to said input.

2. Apparatus as defined in claim 1 wherein said energy storage element comprises a capacitor having a capacitance proportioned in accordance with the following relation:

$$C > \frac{I}{fV}$$

where C is the capacitance of said capicitor, $f$ is the frequency of said input, V is the steady state voltage of said capacitor and I is the steady state current of said capacitor.

3. Apparatus as defined in claim 1 wherein said switch comprises a transistor having its emitter connected to said adjustment network and its base connected to said input and further including biasing means connected to its collector.

4. Apparatus as defined in claim 3 wherein said biasing means is proportioned to bias said transistor for nonsaturating operation.

References Cited

UNITED STATES PATENTS

| | | | |
|---|---|---|---|
| 2,986,655 | 5/1961 | Wiseman et al. | 307—88.5 |
| 3,156,834 | 11/1964 | Stillwell | 307—88.5 |
| 3,267,296 | 8/1966 | Fuss | 307—88.5 |
| 3,280,346 | 10/1966 | Schdute | 307—88.5 |

FOREIGN PATENTS

| | | |
|---|---|---|
| 231,517 | 9/1958 | Australia. |

JOHN S. HEYMAN, *Primary Examiner.*